US012697980B2

(12) United States Patent
Han et al.

(10) Patent No.: US 12,697,980 B2
(45) Date of Patent: Aug. 4, 2026

(54) METHOD FOR EVALUATING STATE OF DRIVER, ELECTRONIC DEVICE, AND NON-TRANSITORY COMPUTER READABLE STORAGE MEDIUM

(71) Applicant: STREAMAX TECHNOLOGY CO., LTD., Shenzhen (CN)

(72) Inventors: Yonggang Han, Shenzhen (CN); Zixian Gu, Shenzhen (CN); Yuling Wang, Shenzhen (CN); Kun He, Shenzhen (CN); Haichuan Qin, Shenzhen (CN)

(73) Assignee: STREAMAX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/849,298

(22) PCT Filed: Oct. 28, 2022

(86) PCT No.: PCT/CN2022/128380
§ 371 (c)(1),
(2) Date: Sep. 20, 2024

(87) PCT Pub. No.: WO2024/087205
PCT Pub. Date: May 2, 2024

(65) Prior Publication Data
US 2026/0184317 A1     Jul. 2, 2026

(51) Int. Cl.
B60W 40/09 (2012.01)
G06N 3/045 (2023.01)
B60W 40/08 (2012.01)

(52) U.S. Cl.
CPC ............. B60W 40/09 (2013.01); G06N 3/045 (2023.01); B60W 2040/0818 (2013.01); B60W 2540/043 (2020.02)

(58) Field of Classification Search
CPC ............... G06Q 40/08; G06Q 30/0207; G06Q 30/0266; B60W 40/09; B60W 2540/043;
(Continued)

(56) References Cited

U.S. PATENT DOCUMENTS 10,618,523 B1 * 4/2020 Fields .................... G06Q 40/08
2015/0053066 A1 * 2/2015 Hampiholi ............. B60K 35/10
84/602

(Continued)

FOREIGN PATENT DOCUMENTS

CN        108407816 A      8/2018
CN        108423006 A      8/2018
(Continued)

OTHER PUBLICATIONS

Extended European Search Report for EP Application 22963186.6; Issue date, Jun. 3, 2025, 8 pages.
(Continued)

*Primary Examiner* — Toan C To
(74) *Attorney, Agent, or Firm* — CANTOR COLBURN LLP

(57)        ABSTRACT

A method for evaluating a state of a driver, an electronic device, and a storage medium. The method includes: performing, according to current driving behavior data and mental state data of the driver, a behavior analysis on the driver to obtain a behavior event of the driver, and generating temporal event information according to the behavior event; performing a driving habit analysis on the driver to generate driving habit information of the driver in the current time period; invoking, according to identity information of the driver, a driver portrait library to obtain driver portrait information of the driver; and performing, using a preset information fusion analysis model, an information fusion analysis on the temporal event information, the
(Continued)

driving habit information and the driver portrait information, and evaluating the state of the driver according to an analysis result to obtain a state evaluation result of the driver.

20 Claims, 6 Drawing Sheets

(58) Field of Classification Search
CPC ......... B60W 2556/10; B60W 2556/45; B60W 2756/10; B60W 2040/0818; G07C 5/008; G07C 5/085; G06N 3/045
See application file for complete search history.

(56) References Cited

U.S. PATENT DOCUMENTS

| | | | | | |
|---|---|---|---|---|---|
| 2016/0001781 | A1* | 1/2016 | Fung | .................... | G06V 10/82 |
| | | | | | 701/36 |
| 2017/0200449 | A1* | 7/2017 | Penilla | ................... | G10L 25/63 |
| 2018/0012092 | A1* | 1/2018 | Gleeson-May | ........ | G06V 10/95 |
| 2019/0185009 | A1 | 6/2019 | Werner et al. | | |
| 2020/0239007 | A1 | 7/2020 | Sobhany | | |
| 2021/0224917 | A1 | 7/2021 | Gaudin et al. | | |
| 2022/0161813 | A1* | 5/2022 | Oba | .................. | B60W 60/0053 |
| 2023/0007439 | A1* | 1/2023 | Williams | ........... | G06Q 20/4014 |

FOREIGN PATENT DOCUMENTS

| | | |
|---|---|---|
| CN | 110909718 A | 3/2020 |
| EP | 3266668 A1 | 1/2018 |
| EP | 3416147 A1 | 12/2018 |

OTHER PUBLICATIONS

International Search Report for International Application No. PCT/CN2022/128380; Mailing Date, Jul. 1, 2023.
Written Opinion for International Application No. PCT/CN2022/128380; Mailing Date, Jul. 1, 2023.

* cited by examiner

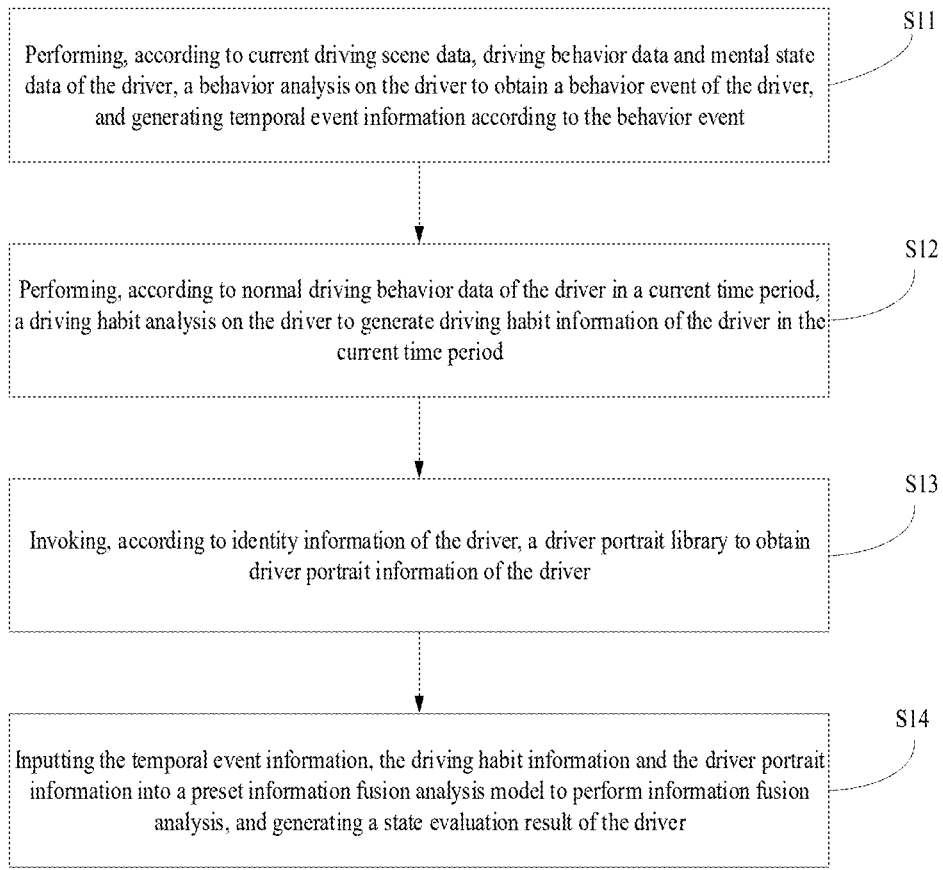

Performing, according to current driving scene data, driving behavior data and mental state data of the driver, a behavior analysis on the driver to obtain a behavior event of the driver, and generating temporal event information according to the behavior event

S11

Performing, according to normal driving behavior data of the driver in a current time period, a driving habit analysis on the driver to generate driving habit information of the driver in the current time period

S12

Invoking, according to identity information of the driver, a driver portrait library to obtain driver portrait information of the driver

S13

Inputting the temporal event information, the driving habit information and the driver portrait information into a preset information fusion analysis model to perform information fusion analysis, and generating a state evaluation result of the driver

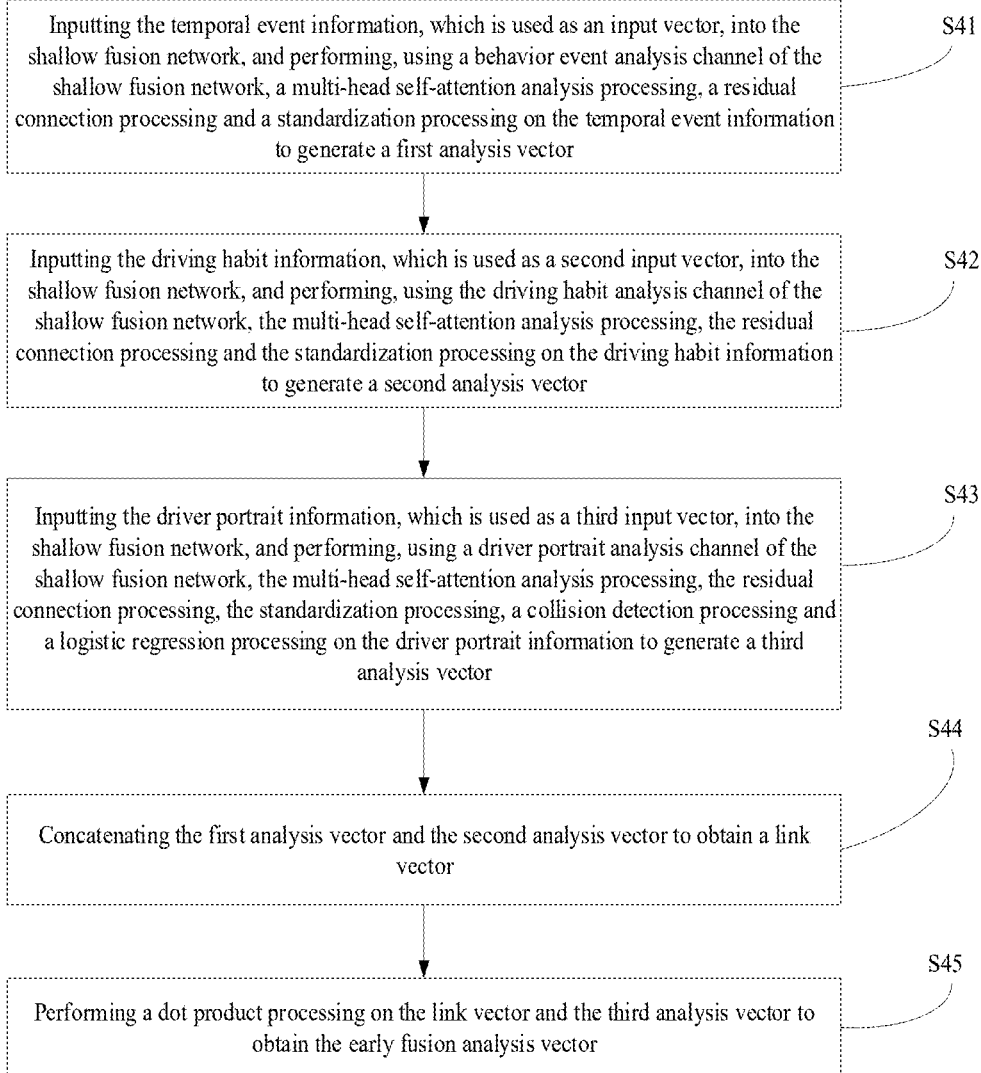

Inputting the temporal event information, which is used as an input vector, into the shallow fusion network, and performing, using a behavior event analysis channel of the shallow fusion network, a multi-head self-attention analysis processing, a residual connection processing and a standardization processing on the temporal event information to generate a first analysis vector     S41

Inputting the driving habit information, which is used as a second input vector, into the shallow fusion network, and performing, using the driving habit analysis channel of the shallow fusion network, the multi-head self-attention analysis processing, the residual connection processing and the standardization processing on the driving habit information to generate a second analysis vector     S42

Inputting the driver portrait information, which is used as a third input vector, into the shallow fusion network, and performing, using a driver portrait analysis channel of the shallow fusion network, the multi-head self-attention analysis processing, the residual connection processing, the standardization processing, a collision detection processing and a logistic regression processing on the driver portrait information to generate a third analysis vector     S43

Concatenating the first analysis vector and the second analysis vector to obtain a link vector     S44

Performing a dot product processing on the link vector and the third analysis vector to obtain the early fusion analysis vector     S45

FIG. 4

METHOD FOR EVALUATING STATE OF DRIVER, ELECTRONIC DEVICE, AND NON-TRANSITORY COMPUTER READABLE STORAGE MEDIUM

CROSS-REFERENCE TO RELATED APPLICATION

This application is a 35 U.S.C. § 371 national stage application of PCT patent application No. PCT/CN2022/128380, filed on Oct. 28, 2022, the entire contents of which are incorporated herein by reference.

TECHNICAL FIELD

The present application relates to the field of vehicle driving technologies, and more particularly, to a method for evaluating state of driver, an electronic device, and a non-transitory computer readable storage medium.

BACKGROUND

Traffic accidents increase with the continuous popularization of vehicles. A driving state of a driver has serious influence on safe driving. Therefore, it is better to bring the driver into a good driving state. In a driving process of the driver, if the driver has a bad driving state due to problems such as fatigue, attention dispersion and the like, a decline in determination capability may be caused, and a road traffic accident is extremely prone to occur. Currently, an existing method for evaluating a state of a driver generally determines whether the driver is fatigued through eye closing duration, determines whether the driver is distracted through a orientation angle of a face, and determines whether the driver is in a dangerous state through a single behavior event such as a rapid acceleration, a sudden deceleration, and a sharp turning. However, when many drivers are tired, the eyes of these drivers are not necessarily closed. When a driver wears a sunglass or a spectacle, strong light reflected by the sunglass or the spectacle causes an eye state of the driver to be invisible, and strong light irradiation causes the driver to squint, and it seems that the eye of the driver is closed. It is difficult to determine whether the driver is fatigued in these scenarios accurately, and fatigue of the driver cannot be classified effectively. The orientation angle of the face is prone to be influenced by an installation angle and an installation distance, when an installation distance of a camera is far, a pupil of the driver cannot be seen, and inaccurate sight detection is caused due to the influence of the spectacle and sizes of the eyes of the driver, more erroneous judgments and missed judgments occur in a real application scenario. Although there is a possibility that single behavior event including the rapid acceleration, the sudden deceleration, the sharp turning is caused due to dangerous driving, there may not necessarily be a sufficient and necessary relationship between the single behavior event and the dangerous driving. Even if some behaviors such as the rapid acceleration, the sudden deceleration, the sharp turning and the like occur in some driving scenes, these behaviors are merely caused due to the driving habit of the driver, and is irrelevant to danger. Therefore, the existing method for evaluating the state of the driver has a problem of low evaluation accuracy.

SUMMARY

In view of this, the embodiments of the present application provide a method for evaluating a state of a driver, an electronic device and a non-transitory computer readable storage medium, which aim at solving the problem of low evaluation accuracy existing in the related art.

In accordance with the first aspect of the embodiments of the present application, a method for evaluating a state of a driver is provided. The method is implemented by an electronic device and includes: performing, according to current driving scene data, driving behavior data and mental state data of the driver, a behavior analysis on the driver to obtain a behavior event of the driver, and generating temporal event information according to the behavior event; performing, according to normal driving behavior data of the driver in a current time period, a driving habit analysis on the driver to generate driving habit information of the driver in the current time period; invoking, according to identity information of the driver, a driver portrait library to obtain driver portrait information of the driver; and performing, using a preset information fusion analysis model, an information fusion analysis on the temporal event information, the driving habit information and the driver portrait information, and evaluating the state of the driver according to an analysis result to obtain a state evaluation result of the driver.

In one embodiment, the step of performing, using the preset information fusion analysis model, the information fusion analysis on the temporal event information, the driving habit information and the driver portrait information, and evaluating the state of the driver according to the analysis result to obtain the state evaluation result of the driver includes: performing, using a shallow fusion network in the information fusion analysis model, an early fusion analysis on the temporal event information, the driving habit information and the driver portrait information to generate an early fusion analysis vector; performing, using a deep fusion network in the information fusion analysis model, a late fusion analysis on the early fusion analysis vector and the driver portrait information to generate a late fusion analysis vector; and evaluating the state of the driver according to the late fusion analysis vector to obtain the state evaluation result of the driver. The state evaluation result of the driver includes one or more information selected from a group consisting of fatigue level information, distraction information, and driving risk level information.

In one embodiment, the step of performing, using the shallow fusion network in the information fusion analysis model, the early fusion analysis on the temporal event information, the driving habit information and the driver portrait information to generate the early fusion analysis vector includes: inputting the temporal event information, which is used as a first input vector, into the shallow fusion network, and performing, using a behavior event analysis channel of the shallow fusion network, a multi-head self-attention analysis processing, a residual connection processing and a standardization processing on the temporal event information to generate a first analysis vector; inputting the driving habit information, which is used as a second input vector, into the shallow fusion network, and performing, using the driving habit analysis channel of the shallow fusion network, the multi-head self-attention analysis processing, the residual connection processing and the standardization processing on the driving habit information to generate a second analysis vector; and inputting the driver portrait information, which is used as a third input vector, into the shallow fusion network, and performing, using a driver portrait analysis channel of the shallow fusion network, the multi-head self-attention analysis processing, the residual connection processing, the standardization processing, a collision detection processing and a logistic regression processing on the driver portrait information to generate a third analysis vector; concatenating the first analysis vector with the second analysis vector to obtain a link vector; and performing a dot product processing on the link vector and the third analysis vector to obtain the early fusion analysis vector.

In one embodiment, the step of performing, using the deep fusion network in the information fusion analysis model, the late fusion analysis on the early fusion analysis vector and the driver portrait information to generate the late fusion analysis vector includes: inputting the early fusion analysis vector, which is used as a fourth input vector, into the deep fusion network, and performing, using a fusion result analysis channel in the deep fusion network, a multi-head self-attention analysis processing, a residual connection processing, a standardization processing and a concatenation processing on the early fusion analysis vector to generate a fourth analysis vector; inputting the driver portrait information, which is used as a fifth input vector, into the deep fusion network, and performing, using a driver portrait analysis channel in the deep fusion network, the multi-head self-attention analysis processing, the residual connection processing, the standardization processing, a collision detection processing and a logistic regression processing on the driver portrait information to generate a fifth analysis vector; and performing a dot product processing on the fourth analysis vector and the fifth analysis vector to obtain the late fusion analysis vector.

In one embodiment, the temporal event information includes at least one of information items selected from a group consisting of event category information, event-start-time-information, event-termination-time-information, event-start-speed-information, event-termination-speed-information, relative-collision-minimum-time-information, minimum-collision-distance-information, collision-accumulation-time-information, collision duration information, traffic flow information, vehicle position information, and vehicle driving duration information.

In one embodiment, after the step of performing the behavior analysis on the driver according to the current driving scene data, the driving behavior data and the mental state data of the driver to obtain the behavior event of the driver, and generating the temporal event information according to the behavior event of the driver, the method further includes: obtaining real-time weather state information in a current driving scene, and adding the real-time weather state information which is taken as one of the information items, to the temporal event information.

In one embodiment, after the step of performing the behavior analysis on the driver according to the current driving scene data, the driving behavior data and the mental state data of the driver to obtain the behavior event of the driver, and generating the temporal event information according to the behavior event of the driver, the method further includes: obtaining road information in a current driving scene, and adding the road information, which is taken as one of the information items, to the temporal event information.

In accordance with the second aspect of the embodiments of the present application, an electronic device is provided. The electronic device includes a memory, a processor and a computer program stored in the memory and executable by the processor, where the processor is configured to, when executing the computer program, implement steps of the method for evaluating the state of the driver.

In accordance with the third aspect of the embodiments of the present application, a non-transitory computer readable storage medium is provided. The non-transitory computer readable storage medium stores a computer program, that, when executed by a processor of the electronic device, causes the processor to implement the method for evaluating the state of the driver.

Compared with the related art, the embodiments of the present application have the following beneficial effects: the temporal event information corresponding to the driver's current behavior event, the driving habit information of the driver in the current time period, and the driver portrait information of the driver are obtained. Then, the preset information fusion analysis model is used to perform the information fusion analysis on the temporal event information, the driving habit information and the driver portrait information to obtain the analysis result. Then, the state of the driver is evaluated according to the analysis result to obtain the state evaluation result of the driver. A series of temporal event features and the driver portrait are combined to determine the state of the driver comprehensively, and thus the accuracies of fatigue state recognition, distraction state recognition and dangerous driving recognition of the driver are improved.

DESCRIPTION OF THE DRAWINGS

In order to describe the embodiments of the present application more clearly, a brief introduction regarding the accompanying drawings that need to be used for describing the embodiments of the present application or the existing technologies is given below. It is obvious that the accompanying drawings described below are merely some embodiments of the present application, a person of ordinary skill in the art may also obtain other drawings according to the current drawings without paying creative efforts.

FIG. 1 illustrates a basic method flowchart of a method for evaluating a state of a driver provided by one embodiment of the present application;

FIG. 4 illustrates a method flowchart of an early fusion analysis in the method for evaluating the state of the driver provided by one embodiment of the present application;

DETAILED DESCRIPTION OF EMBODIMENTS

Figure 2:
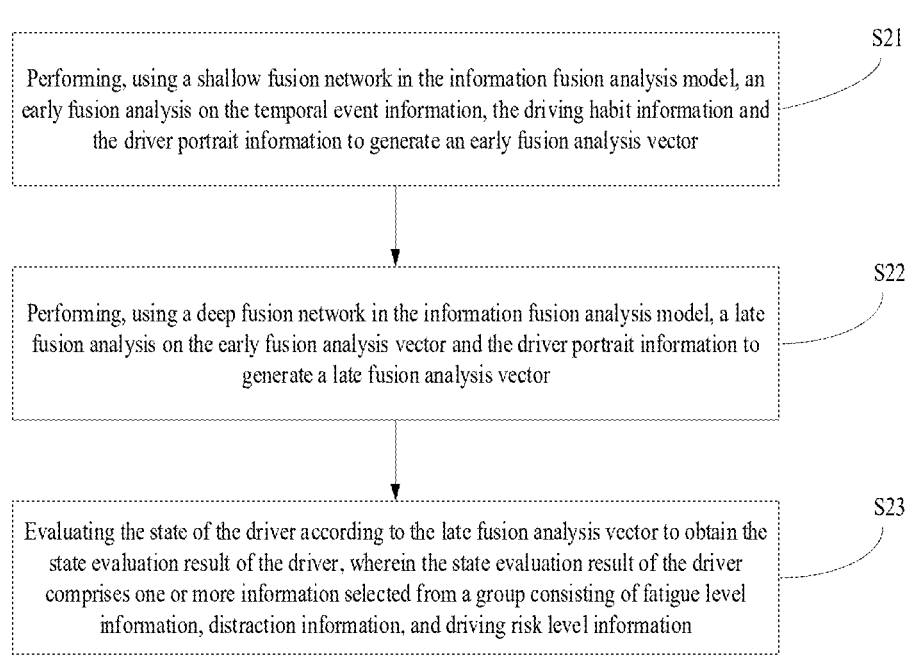
FIG. 2 illustrates a method flowchart of performing information fusion analysis in the method for evaluating the state of the driver provided by one embodiment of the present application.

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application may also be implemented in some other embodiments without these concrete details. In other conditions, detailed explanations of method, device, circuit and system well known to the public are omitted, such that unnecessary details can be avoided from disturbing the description of the present application.

In order to illustrate the technical solutions described in the present application, the present application is described below with reference to the embodiments.

In some embodiments of the present application, referring to FIG. 1, FIG. 1 is a basic method flowchart of a method for evaluating a state of a driver according to one embodiment of the present application.

In a step of S11, a behavior analysis is performed on the driver according to current driving scene data, driving behavior data and mental state data of the driver to obtain a behavior event of the driver, and generating temporal event information according to the behavior event.

In this embodiment, the current driving scene data, the driving behavior data, and the mental state data of the driver may be obtained by performing data acquisition by using cameras and sensors equipped on the vehicle. For example, an ADAS (Advanced Driving Assistance System, ADAS) camera may be used to photograph images on the surrounding environment of the vehicle through an advanced driving assistance system (Advanced Driving Assistance System, ADAS) equipped in the vehicle, to obtain an environment image and calculate driving scene data such as a lane position where the vehicle is located, the surrounding vehicle position, and the surrounding pedestrian position according to surrounding environment information in the displayed environment image. DIS (Digital Indoor System, DIS) camera may be used to photograph an image of a face of the driver through a digital indoor system (Digital Indoor System, DIS) equipped in the vehicle to obtain a face image. Mental state data such as a face position, a face key point, an expression of the driver, and opening and closing states of the eyes of the driver are obtained by calculating according to the face information displayed in the face image. Sensors such as a six-axis sensor and a GPS sensor equipped on the vehicle may be used to perform vehicle motion state detection to obtain the driving behavior data such as rapid acceleration, sudden deceleration, sharp turning, and vehicle speed, and the like. In a system for evaluating a state of a driver, when the behavior analysis is performed on the driver according to the driving scene data, the driving behavior data and the mental state data, an event confirmation processing may be performed by inputting the obtained data into the related event confirmation algorithm, respectively. The event confirmation algorithm is used to confirm the behavior event of the driver in the current state. After the behavior event is confirmed, the corresponding temporal event information is generated according to the confirmed behavior event. It may be understood that the behavior events of the driver may be divided into a plurality of types. In this embodiment, 69 types of behavior events are provided. As an example, the types of the behavior events include a lane keeping event, a front collision event, an eye closing event, a downward glance event, a yawn event, an acceleration event, a deceleration event, a turning event, an emergency acceleration event, an emergency deceleration event, a sharp turn event. In this embodiment, a corresponding event confirmation algorithm may be configured for each type of behavior events in the system for evaluating the state of the driver. In this embodiment, input data for event confirmation algorithms are different, after the driving scene data, the driving behavior data and the mental state data are obtained, the corresponding input data may be obtained from the obtained driving scene data, the driving behavior data and the mental state data according to the respective input requirements of the event confirmation algorithms, such that the event confirmation algorithms can perform behavior analysis according to the respective input data thereof, and confirms whether the driver has conducted the behavior event corresponding to the event confirmation algorithm in the current state. If the event confirmation algorithm confirms that the driver has conducted the behavior event corresponding to the event confirmation algorithm, corresponding temporal event information is generated according to the behavior event corresponding to the event confirmation algorithm.

In some embodiments of the present application, the temporal event information includes the following information items: event category information, event-start-time-information, event-termination-time-information, event-start-speed-information, event-termination-speed-information, relative-collision-minimum-time-information, minimum-collision-distance-information, collision-accumulation-time-information, collision duration information, traffic flow information, vehicle position information, and vehicle driving duration information.

In some embodiments of the present application, a weather information acquisition module may be further configured in the system for evaluating the state of the driver. The weather information acquisition module obtains the real-time weather state information (e.g., rainy day, snowy day, haze day, sunny day) in the current driving scene. After the real-time weather state information is obtained, data fusion is performed on the real-time weather state information and the temporal event information, and the real-time weather state information is taken as an information item and is added to the temporal event information. Thus, an influence factor of weather state is taken into account when the state of the driver is evaluated, and the accuracy of the evaluation result is improved.

In some embodiments of the present application, a map module may be further configured in the system for evaluating the state of the driver, and road information (e.g., traffic lights, intersections, highways, lanes, provincial highways) in the current driving scene may be obtained by using the map module. After the road information is obtained, data fusion is performed on the road information and the temporal event information, and the road information is added to the temporal event information as an information item. Thus, an influence factor of road conditions is taken into account when the state of the driver is evaluated, and the accuracy of the evaluation result is improved.

In a step of S12, a driving habit analysis is performed on the driver according to the normal driving behavior data of the driver in the current time period to generate driving habit information of the driver in the current time period.

In this embodiment, the driving behavior data generated within a period of time closest to the current moment may be used as the normal driving behavior data of the driver in the current time period. For example, assuming that the current moment is 12:10, a preset time range is 5 minutes, then, a time period between a time point of 12:10 and a time point of 12:15 is determined as the current time period of the driver. In this embodiment, the normal driving behavior data is generated at regular intervals according to a predetermined time interval. For example, the normal driving behavior data is generated for every one second, and the obtained normal driving behavior data is time sequence data. In this embodiment, the normal driving behavior data includes vehicle speed data, traffic flow data, position data, six-axis data. The traffic flow data includes the number of front vehicles and the distance between a front vehicle and the current vehicle. In this embodiment, after the normal driving behavior data of the driver in the current time period is obtained, the driving habit analysis may be performed on the driver according to the normal driving behavior data, the real-time driving rule of the driver is counted, and the driving habit information of the driver in the current time period is generated. The driving habit information of the driver in the current time period includes information such as a current time period car following habit of the driver in the current time period, a lane keeping habit of the driver in the current time period, and a vehicle speed maintenance habit of the driver in the current time period.

In a step of S13, a driver portrait library is invoked according to the identity information of the driver to obtain driver portrait information of the driver.

In this embodiment, a driver portrait may be constructed according to the historical driving data of the driver, and the driver portrait may be stored in the driver portrait library. A large number of driver portraits are included in the driver portrait library, and a correspondence relationship between the driver portraits and the driver identity information is established. In this embodiment, the driver portrait information of the driver may be obtained by invoking the driver portrait library according to the identity information of the driver. In this embodiment, the driver portrait information includes information such as an effective time period during which the driver's eye is closed, a closed-eye false alarm time period, and a closed-eye misreport type.

In a step of S14, information fusion analysis is performed on the temporal event information, the driving habit information and the driver portrait information by using a preset information fusion analysis model, and the state of the driver is evaluated according to an analysis result to obtain a state evaluation result of the driver.

In this embodiment, the preset information fusion analysis model is obtained by performing neural network training using the sample data. The information fusion analysis model is trained to perform information fusion analysis according to the temporal event information, the driving habit information and the driver portrait information, evaluate the state of the driver according to the analysis result, and obtain the state evaluation result of the driver. In this embodiment, the information fusion analysis model may use an event stream as an input according to the temporal event information, perform event confirmation through the event stream, and may accurately evaluate the state of the driver when determining that some behavior events of the driver are abnormal. Thus, a misreport rate may be greatly reduced. The information fusion analysis model performs information fusion analysis by combining the driving habit information with the driver portrait information, may use the driver portrait to perform multi-layer constraint, and perceive the state of the drivers of thousands of people, thereby effectively solving the false alarm problem caused due to personalized difference of different drivers, and thereby improving the accuracy of perception for thousands faces of thousands people. When evaluating the state of the driver according to the analysis result, the information fusion analysis model may classify driver states and rank the fatigues and the driving risks of the drivers, thereby effectively improving the accuracy and timeliness of evaluation of the state of the driver.

It may be seen from the above that, according to the method for evaluating the state of the driver provided in this embodiment of the present application, the analysis result may be obtained by obtaining the temporal event information corresponding to the current behavior event of the driver, the driving habit information of the driver in the current time period, and the driver portrait information of the driver. Then, the preset information fusion analysis model is used to perform information fusion analysis on the temporal event information, the driving habit information and the driver portrait information to obtain the analysis result. Then, the state of the driver is evaluated according to the analysis result to obtain the state evaluation result of the driver. The state of the driver is determined based on the combination of a series of temporal event features and the driver portrait, and thus the accuracy of fatigue state recognition, distraction state recognition and dangerous driving recognition of the driver are improved.

In some embodiments of the present application, referring to FIG. 2, FIG. 2 illustrates a method flowchart of performing information fusion analysis in the method for evaluating a state of a driver according to one embodiment of the present application, which is described in detail below:

In a step of S21, a shallow fusion network in the information fusion analysis model is used to perform an early fusion analysis on the temporal event information, the driving habit information and the driver portrait information to generate an early fusion analysis vector.

In a step of S22, a deep fusion network in the information fusion analysis model is used to perform a late fusion analysis on the early fusion analysis vector and the driver portrait information to generate a late fusion analysis vector.

In a step of S23, the state of the driver is evaluated according to the late fusion analysis vector to obtain the state evaluation result of the driver. The state evaluation result of the driver includes one or more of fatigue level information, distraction information, and driving risk level information.

Figure 3:
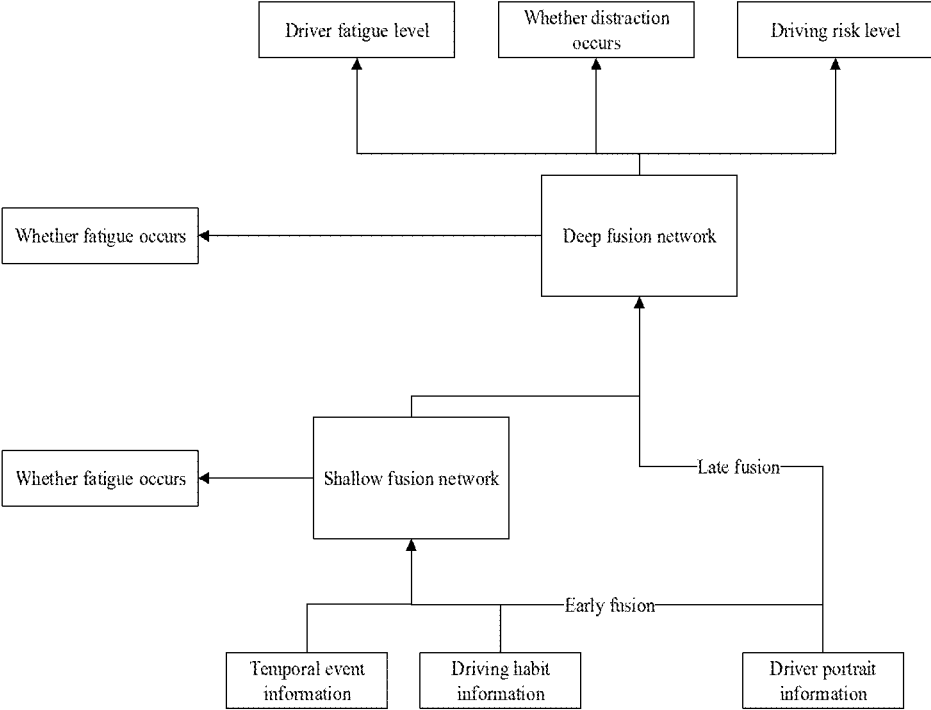
FIG. 3 illustrates a schematic structural diagram of an information fusion analysis model in the method for evaluating the state of the driver provided by one embodiment of the present application.

In this embodiment, referring to FIG. 3, FIG. 3 illustrates a schematic structural diagram of an information fusion analysis model in the method for evaluating a state of a driver according to one embodiment of the present application. As shown in FIG. 3, the information fusion analysis model includes a shallow fusion network and a deep fusion network. For example, the shallow fusion network may be constructed based on a behavior encoder framework of a transformer model. In this embodiment, when the preset information fusion analysis model is used to perform the information fusion analysis on the temporal event information, the driving habit information and the driver portrait information, the temporal event information, the driving habit information, and the driver portrait information may be input into the shallow fusion network together, the shallow fusion network is utilized to analyze the temporal event information, the driving habit information and the driver portrait information to obtain the early fusion analysis vector. Then, the early fusion analysis vector obtained by analyzing through the shallow fusion network is input into the deep fusion network, and the driver portrait information is input into the deep fusion network simultaneously when the early fusion analysis vector is input into the deep fusion network. The deep fusion network is utilized to analyze and obtain the late fusion analysis vector according to the early fusion analysis vector and the driver portrait information. For example, in this embodiment, the state of the drivers may be classified in the information fusion analysis model, each state category has a corresponding feature vector. After the deep fusion network analysis obtains the late fusion analysis vector through analysis, a vector similarity comparison may be performed according to the late fusion analysis vector and the feature vectors corresponding to various state categories. Thus, the state of the driver is determined according to the vector similarity, including the determination of the fatigue level of the driver, the determination regarding whether the driver is distracted and the determination of the driving risk level. Therefore, the state of the driver is evaluated, and the state evaluation result of the driver is obtained. The state evaluation result of the driver includes one or more of fatigue level information, distraction information, and driving risk level information. In this embodiment, based on the structure of the information fusion analysis model, when the information fusion analysis model is trained, whether the state of the driver is fatigue may be determined in the shallow fusion network and the deep fusion network, respectively. In this way, two pre-training networks are obtained by training. Then, the information fusion analysis model is trained by combining the two pre-training networks. Thus, the amount of sample data required by training the information fusion analysis model may be effectively reduced.

In some embodiments of the present application, referring to FIG. 4, FIG. 4 illustrates a method flowchart of performing early fusion analysis in the method for evaluating a state of a driver according to one embodiment of the present application, and the method flowchart is described in detail below:

In a step of S41, the temporal event information is input as an input vector to the shallow fusion network, and a behavior event analysis channel of the shallow fusion network is used to perform multi-head self-attention analysis processing, residual connection processing and standardization processing on the temporal event information to generate a first analysis vector.

In a step of S42, the driving habit information is input as an input vector to the shallow fusion network, and a driving habit analysis channel of the shallow fusion network is used to perform the multi-head self-attention analysis processing, the residual connection processing and the standardization processing on the driving habit information to generate a second analysis vector;

In a step of S43, the driver portrait information is input as an input vector to the shallow fusion network, and a driver portrait analysis channel of the shallow fusion network is used to perform the multi-head self-attention analysis processing, the residual connection processing, the standardization processing, the collision detection processing and a logistic regression processing on the driver portrait information to generate a third analysis vector;

In a step of S44, a concatenation processing is performed on the first analysis vector and the second analysis vector to obtain a link vector.

In a step of S45, a dot product processing is performed on the link vector and the third analysis vector to obtain an early fusion analysis vector.

Figure 5:
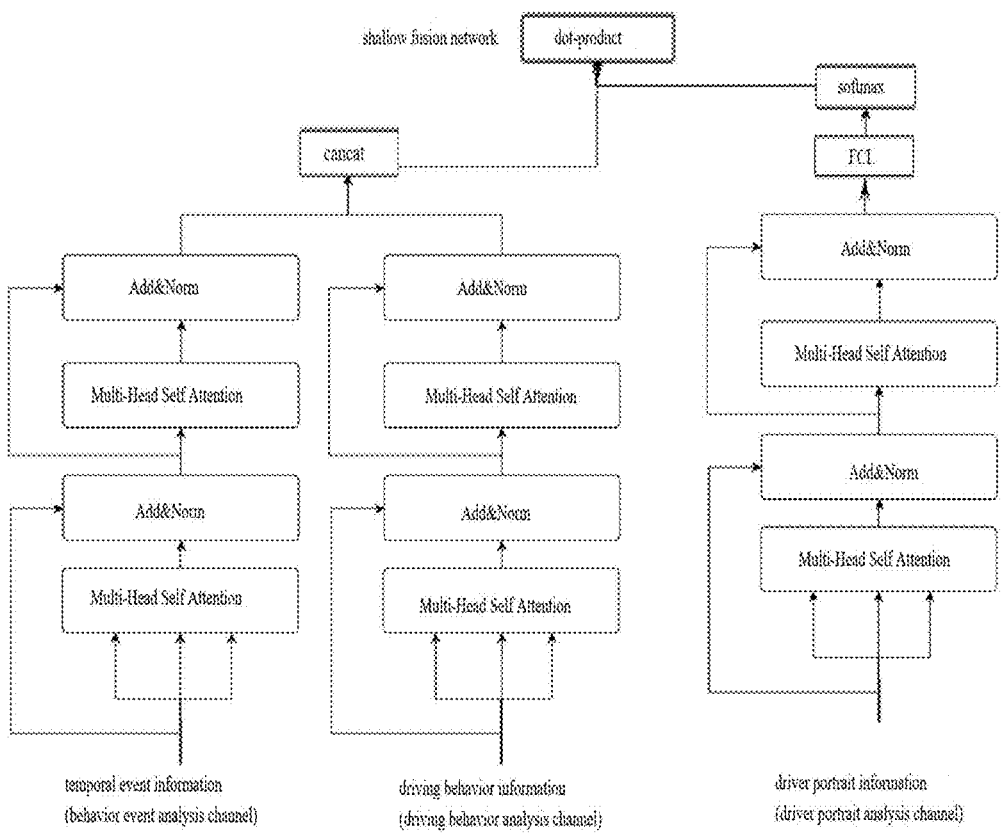
FIG. 5 illustrates a schematic structural diagram of a shallow fusion network in the method for evaluating the state of the driver provided by one embodiment of the present application.

In this embodiment, referring to FIG. 5, FIG. 5 illustrates a schematic structural diagram of a shallow fusion network in the method for evaluating a state of a driver according to one embodiment of the present application. As shown in FIG. 5, the shallow fusion network includes three analysis channels, and the three analysis channels are a behavior event analysis channel, a driving habit analysis channel and a driver portrait analysis channel, respectively. The behavior event analysis channel and the driving habit analysis channel are provided with a multi-head self-attention analysis layer and a residual connection and standardization processing layer (Add & Norm). In this embodiment, the temporal event information may be used as an input vector and is input into the shallow fusion network, the behavior event analysis channel of the shallow fusion network may be used to perform the multi-head self-attention analysis processing, the residual connection processing and the standardization processing on the temporal event information, thereby generating the first analysis vector. The driving habit information is used as an input vector and is input into the shallow fusion network, and the driving habit analysis channel of the shallow fusion network is used to perform the multi-head self-attention analysis processing, the residual connection processing and the standardization processing on the driving habit information to generate the second analysis vector. In this embodiment, the multi-head self-attention analysis processing, the residual connection processing, and the standardization processing may be performed on the temporal event information and the driving habit information multiple times to generate the first analysis vector and the second analysis vector according to actual analysis requirements. In this embodiment, the multi-head self-attention analysis layer, the residual connection and standardization processing layer (Add & Norm), a collision detection layer (FCL), and a logistic regression processing layer (Softmax) are provided in the driver portrait analysis channel. In this embodiment, the driver portrait information is used as the input vector and is input into the shallow fusion network, and the driver portrait analysis channel of the shallow fusion network is used to perform the multi-head self-attention analysis processing, the residual connection processing, the standardization processing, the collision detection processing and the logistic regression processing on the driver portrait information to generate the third analysis vector. In this embodiment, after the first analysis vector, the second analysis vector and the third analysis vector are obtained respectively by the three analysis channels in the shallow fusion network, the first analysis vector and the second analysis vector may be concatenated through a concatenation function (Concat) to obtain the link vector. Furthermore, the dot product processing is performed on the link vector and the third analysis vector to obtain the early fusion analysis vector. In this embodiment, in the generating process of the third analysis vector, the driver portrait analysis channel may perform the multi-head self-attention analysis processing, the residual connection processing, and the standardization processing on the driver portrait information multiple times according to actual analysis requirements. In this embodiment, the early fusion analysis is performed on the temporal event information, the driving habit information and the driver portrait information through the shallow fusion network, such that local features of the network can be constrained, the output analysis vector is more relevant with the key behavior event, and a weak correlation behavior event is filtered.

Figure 6:
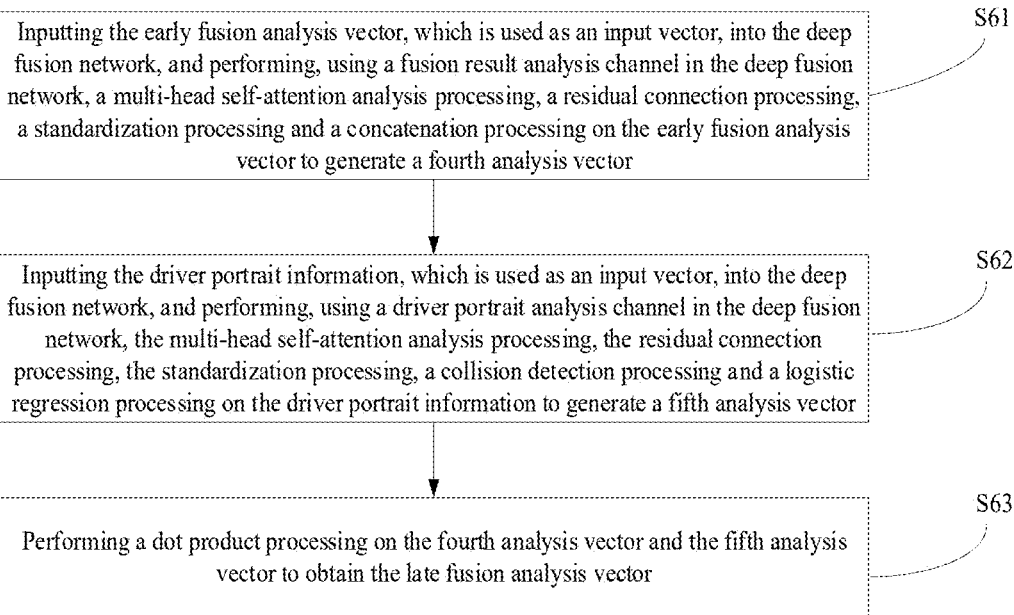
FIG. 6 illustrates a method flowchart of performing a late fusion analysis in the method for evaluating the state of the driver provided by one embodiment of the present application.

In some embodiments of the present application, referring to FIG. 6, FIG. 6 illustrates a method flowchart of performing a late fusion analysis in the method for evaluating a state of a driver according to one embodiment of the present application, and the method flowchart is described in detail below:

In a step of S61, the early fusion analysis vector, which is used as an input vector, is input to the deep fusion network, and a fusion result analysis channel in the deep fusion network is used to perform the multi-head self-attention analysis processing, the residual connection processing, the standardization processing and the concatenation processing on the early fusion analysis vector to generate a fourth analysis vector.

In a step of S62, the driver portrait information, which is used as an input vector, is input to the deep fusion network, and a driver portrait analysis channel in the deep fusion network is used to perform the multi-head self-attention analysis processing, the residual connection processing, the standardization processing, the collision detection processing and the logistic regression processing on the driver portrait information to generate a fifth analysis vector;

In a step of S63, a dot product processing is performed on the fourth analysis vector and the fifth analysis vector to obtain the late fusion analysis vector.

Figure 7:
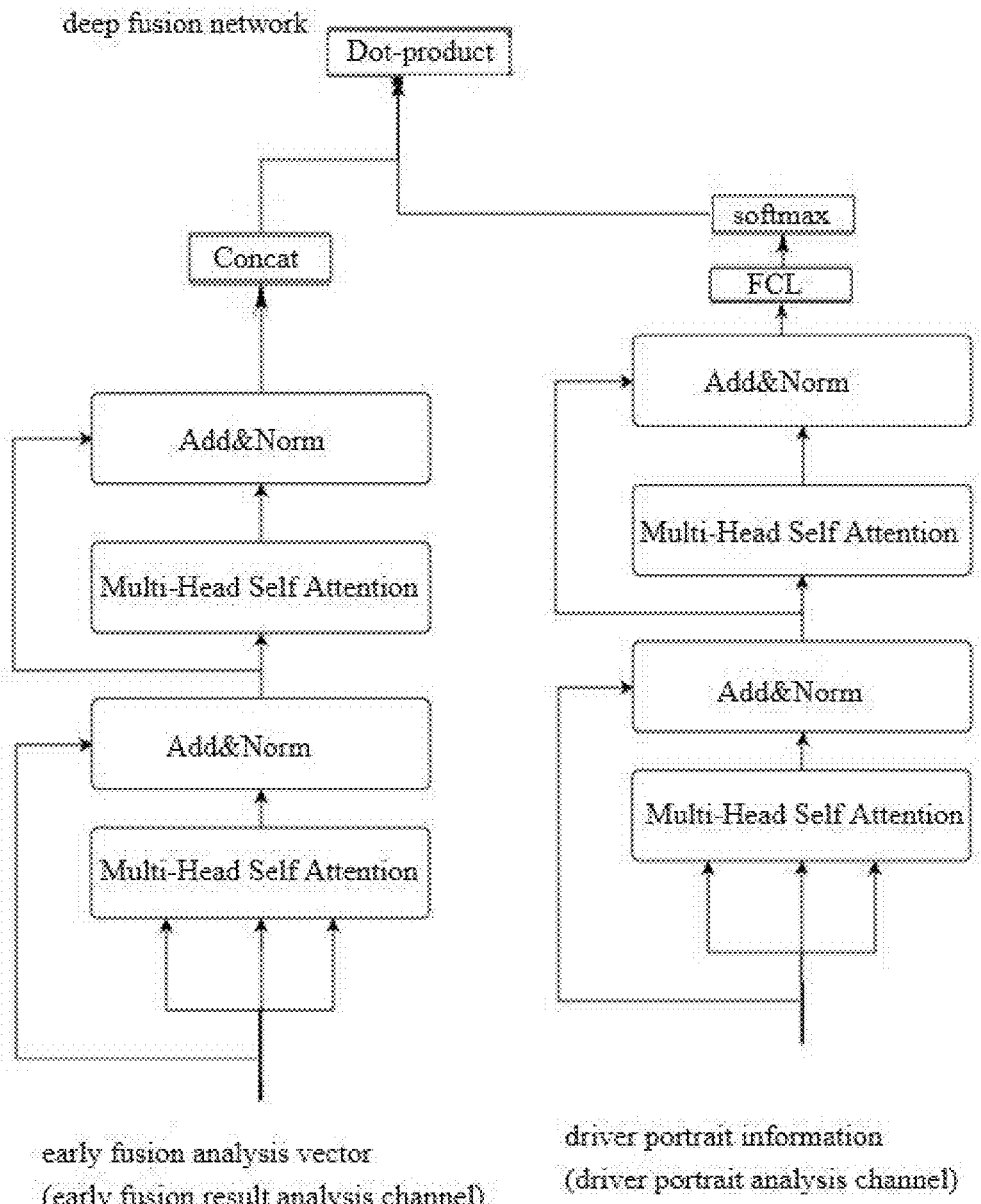
FIG. 7 is a schematic structural diagram of a deep fusion network in the method for evaluating the state of the driver provided by one embodiment of the present application.

In this embodiment, FIG. 7 illustrates a schematic structural diagram of a deep fusion network in the method for evaluating a state of a driver according to one embodiment of the present application. As shown in FIG. 7, the deep fusion network includes two analysis channels which are the early fusion result analysis channel and the driver portrait analysis channel, respectively. The early fusion result analysis channel is provided with the multi-head self-attention analysis layer (Multi-Head Self Attention) and the residual connection and standardization processing layer (Add & Norm) and the concatenation processing layer (Concat). In this embodiment, the early fusion analysis vector output by the shallow fusion network, which is used as the input vector of the deep fusion network, is input into the deep fusion network, and the fusion result analysis channel in the deep fusion network is used to perform the multi-head self-attention analysis processing, the residual connection processing, the standardization processing and the concatenation processing on the early fusion analysis vector to generate the fourth analysis vector. The driver portrait analysis channel is provided with a multi-head self-attention analysis layer (Multi-Head Self Attention), a residual connection and standardization processing layer (Add & Norm), a collision detection layer (FCL), and a logistic regression processing layer (Softmax). In this embodiment, the driver portrait information is used as the input vector again and is input into the deep fusion network, and the driver portrait analysis channel in the deep fusion network is used to perform the multi-head self-attention analysis processing, the residual connection processing, the standardization processing, the collision detection processing and the logistic regression processing on the driver portrait information to generate the fifth analysis vector. After generating the fourth analysis vector and the fifth analysis vector by the deep fusion network, the deep fusion network may obtain the late fusion analysis vector by performing dot-product processing on the fourth analysis vector and the fifth analysis vector. In this embodiment, the late fusion is performed through the deep fusion network, a weight distribution of various parameters of the network may be optimized globally. Through the early fusion analysis of the shallow fusion network in combination with the late fusion analysis of the deep fusion network, a false alarm problem caused due to personalized differences of drivers may be effectively solved, and the accuracy of perception for thousands of faces of thousands of drivers is improved.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to implementation processes of the embodiments of the present application.

Figure 8:
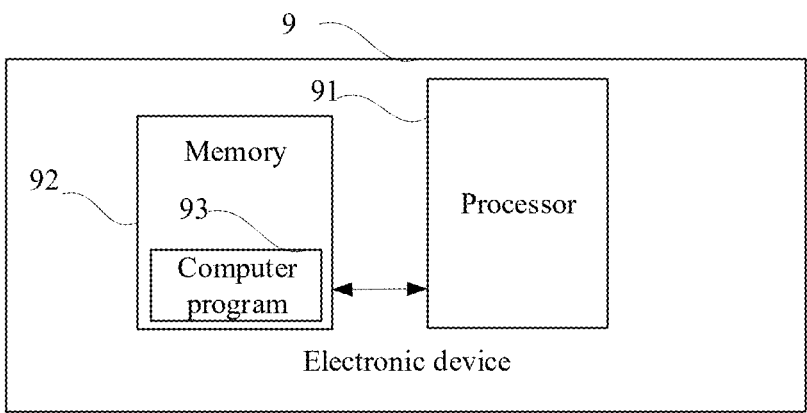
FIG. 8 is a schematic diagram of an electronic device provided by one embodiment of the present application.

In some embodiments of the present application, referring to FIG. 8, FIG. 8 illustrates a schematic diagram of an electronic device 9 provided in the embodiments of the present application. The electronic device 9 may be a vehicle-mounted device terminal or a cloud terminal, and a communication unit is used for transmitting and receiving data and signaling. As shown in FIG. 8, the electronic device 9 in this embodiment includes: a processor 91, a memory 92, and a computer program 93 (e.g., a driver state evaluation program or a data processing program) stored in the memory 92 and executable by the processor 91. When the computer program 92 is executed by the processor 91, the steps in the embodiments of the method for evaluating the state of the driver or the steps in the data processing methods are implemented.

The electronic device 9 may include but is not limited to: a processor 91, the memory 92. A person of ordinary skill in the art can understand that, FIG. 8 is only one example of the electronic device 9, but should not be constituted as limitation to the electronic device 9. More or less components than the components shown in FIG. 8 may be included. As an alternative, some components or different components may be combined. For example, the electronic device 9 may also include an input and output device, a network access device, a bus, etc.

The so-called processor 91 may be central processing unit (Central Processing Unit, CPU), and can also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor; as an alternative, the processor may also be any conventional processor, or the like.

The memory 92 may be an internal storage unit of the electronic device 10, such as a hard disk or a memory of the electronic device 10. The memory 92 may also be an external storage device of the electronic device 10, such as a plug-in hard disk, a smart media card (Smart Media Card, SMC), a secure digital (Secure Digital, SD) card, a flash card (Flash Card, FC) equipped on the electronic device 10. Furthermore, the memory 92 may not only include the internal storage unit of the electronic device 10, but also include the external memory of the electronic device 10. The memory 92 is configured to store the computer program, and other procedures and data needed by the electronic device 10. The memory 92 may also be configured to store data that has been output or being ready to be output temporarily.

In the aforesaid embodiments, the descriptions of the various embodiments are emphasized respectively, regarding a part of one embodiment which has not been described or disclosed in detail, reference can be made to relevant descriptions in other embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

When an integrated unit is achieved in the form of software functional units, and is sold or used as an independent product, the integrated unit may be stored in a computer readable storage medium. Based on this understanding, a whole or part of flow process for implementing the method in the embodiments of the present application may also be accomplished in the manner of using computer program to instruct relevant hardware. When the computer program is executed by the processor, the steps in the various method embodiments may be implemented. The computer program includes computer program codes, which may be in the form of source code, object code, executable documents or some intermediate form, etc. The computer readable medium may include: any physical equipment or device that can carry the computer program codes, recording medium, USB flash disk, mobile hard disk, hard disk, optical disk, computer memory, ROM (Read-Only Memory), RAM (Random Access Memory).

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A method for evaluating a state of a driver implemented by an electronic device, the method comprising:

performing, according to current driving scene data, driving behavior data and mental state data of the driver, a behavior analysis on the driver to obtain a behavior event of the driver, and generating temporal event information according to the behavior event;

performing, according to normal driving behavior data of the driver in a current time period, a driving habit analysis on the driver to generate driving habit information of the driver in the current time period;

invoking, according to identity information of the driver, a driver portrait library to obtain driver portrait information of the driver; and performing, using a preset information fusion analysis model, an information fusion analysis on the temporal event information, the driving habit information and the driver portrait information, and evaluating the state of the driver according to an analysis result to obtain a state evaluation result of the driver.

2. The method according to claim 1, wherein said performing, using the preset information fusion analysis model, the information fusion analysis on the temporal event information, the driving habit information and the driver portrait information, and evaluating the state of the driver according to the analysis result to obtain the state evaluation result of the driver comprises:

performing, using a shallow fusion network in the information fusion analysis model, an early fusion analysis on the temporal event information, the driving habit information and the driver portrait information to generate an early fusion analysis vector;

performing, using a deep fusion network in the information fusion analysis model, a late fusion analysis on the early fusion analysis vector and the driver portrait information to generate a late fusion analysis vector; and evaluating the state of the driver according to the late fusion analysis vector to obtain the state evaluation result of the driver, wherein the state evaluation result of the driver comprises one or more information selected from a group consisting of fatigue level information, distraction information, and driving risk level information.

3. The method according to claim 2, wherein said performing, using the shallow fusion network in the information fusion analysis model, the early fusion analysis on the temporal event information, the driving habit information and the driver portrait information to generate the early fusion analysis vector comprises:

inputting the temporal event information, which is used as a first input vector, into the shallow fusion network, and performing, using a behavior event analysis channel of the shallow fusion network, a multi-head self-attention analysis processing, a residual connection processing and a standardization processing on the temporal event information to generate a first analysis vector;

inputting the driving habit information, which is used as a second input vector, into the shallow fusion network, and performing, using a driving habit analysis channel of the shallow fusion network, the multi-head self-attention analysis processing, the residual connection processing and the standardization processing on the driving habit information to generate a second analysis vector;

inputting the driver portrait information, which is used as a third input vector, into the shallow fusion network, and performing, using a driver portrait analysis channel of the shallow fusion network, the multi-head self-attention analysis processing, the residual connection processing, the standardization processing, a collision detection processing and a logistic regression processing on the driver portrait information to generate a third analysis vector;

concatenating the first analysis vector and the second analysis vector to obtain a link vector; and performing a dot product processing on the link vector and the third analysis vector to obtain the early fusion analysis vector.

4. The method according to claim 2, wherein said performing, using the deep fusion network in the information fusion analysis model, the late fusion analysis on the early fusion analysis vector and the driver portrait information to generate the late fusion analysis vector comprises:

inputting the early fusion analysis vector, which is used as a fourth input vector, into the deep fusion network, and performing, using a fusion result analysis channel in the deep fusion network, a multi-head self-attention analysis processing, a residual connection processing, a standardization processing and a concatenation processing on the early fusion analysis vector to generate a fourth analysis vector;

inputting the driver portrait information, which is used as a fifth input vector, into the deep fusion network, and performing, using a driver portrait analysis channel in the deep fusion network, the multi-head self-attention analysis processing, the residual connection processing, the standardization processing, a collision detection processing and a logistic regression processing on the driver portrait information to generate a fifth analysis vector; and performing a dot product processing on the fourth analysis vector and the fifth analysis vector to obtain the late fusion analysis vector.

5. The method according to claim 1, wherein the temporal event information comprises at least one of information items selected from a group consisting of:

event category information, event-start-time-information, event-termination-time-information, event-start-speed-information, event-termination-speed-information, relative-collision-minimum-time-information, minimum-collision-distance-information, collision-accumulation-time-information, collision duration information, traffic flow information, vehicle position information, and vehicle driving duration information.

6. The method according to claim 5, wherein after said performing the behavior analysis on the driver according to the current driving scene data, the driving behavior data and the mental state data of the driver to obtain the behavior event of the driver, and generating the temporal event information according to the behavior event of the driver, the method further comprises:

obtaining real-time weather state information in a current driving scene, and adding the real-time weather state information which is taken as one of the information items, to the temporal event information.

7. The method according to claim 5, wherein after said performing the behavior analysis on the driver according to the current driving scene data, the driving behavior data and the mental state data of the driver to obtain the behavior event of the driver, and generating the temporal event information according to the behavior event of the driver, the method further comprises:

obtaining road information in a current driving scene, and adding the road information, which is taken as one of the information items, to the temporal event information.

8. An electronic device, comprising a memory, a processor and a computer program stored in the memory and executable by the processor, wherein the processor is configured to, when executing the computer program, implement a method for evaluating a state of a driver, comprising steps of:

performing, according to current driving scene data, driving behavior data and mental state data of the driver, a behavior analysis on the driver to obtain a behavior event of the driver, and generating temporal event information according to the behavior event;

performing, according to normal driving behavior data of the driver in a current time period, a driving habit analysis on the driver to generate driving habit information of the driver in the current time period;

invoking, according to identity information of the driver, a driver portrait library to obtain driver portrait information of the driver; and performing, using a preset information fusion analysis model, an information fusion analysis on the temporal event information, the driving habit information and the driver portrait information, and evaluating the state of the driver according to an analysis result to obtain a state evaluation result of the driver.

9. The electronic device according to claim 8, wherein the processor is further configured to perform the step of performing, using the preset information fusion analysis model, the information fusion analysis on the temporal event information, the driving habit information and the driver portrait information, and evaluating the state of the driver according to the analysis result to obtain the state evaluation result of the driver by:

performing, using a shallow fusion network in the information fusion analysis model, an early fusion analysis on the temporal event information, the driving habit information and the driver portrait information to generate an early fusion analysis vector;

performing, using a deep fusion network in the information fusion analysis model, a late fusion analysis on the early fusion analysis vector and the driver portrait information to generate a late fusion analysis vector; and evaluating the state of the driver according to the late fusion analysis vector to obtain the state evaluation result of the driver, wherein the state evaluation result of the driver comprises one or more information selected from a group consisting of fatigue level information, distraction information, and driving risk level information.

10. The electronic device according to claim 9, wherein the processor is further configured to perform the step of performing, using the shallow fusion network in the information fusion analysis model, the early fusion analysis on the temporal event information, the driving habit information and the driver portrait information to generate the early fusion analysis vector by:

inputting the temporal event information, which is used as a first input vector, into the shallow fusion network, and performing, using a behavior event analysis channel of the shallow fusion network, a multi-head self-attention analysis processing, a residual connection processing and a standardization processing on the temporal event information to generate a first analysis vector;

inputting the driving habit information, which is used as a second input vector, into the shallow fusion network, and performing, using a driving habit analysis channel of the shallow fusion network, the multi-head self-attention analysis processing, the residual connection processing and the standardization processing on the driving habit information to generate a second analysis vector;

inputting the driver portrait information, which is used as a third input vector, into the shallow fusion network, and performing, using a driver portrait analysis channel of the shallow fusion network, the multi-head self-attention analysis processing, the residual connection processing, the standardization processing, a collision detection processing and a logistic regression processing on the driver portrait information to generate a third analysis vector;

concatenating the first analysis vector and the second analysis vector to obtain a link vector; and performing a dot product processing on the link vector and the third analysis vector to obtain the early fusion analysis vector.

11. The electronic device according to claim 9, wherein the processor is further configured to perform the step of performing, using the deep fusion network in the information fusion analysis model, the late fusion analysis on the early fusion analysis vector and the driver portrait information to generate the late fusion analysis vector by:

inputting the early fusion analysis vector, which is used as a fourth input vector, into the deep fusion network, and performing, using a fusion result analysis channel in the deep fusion network, a multi-head self-attention analysis processing, a residual connection processing, a standardization processing and a concatenation processing on the early fusion analysis vector to generate a fourth analysis vector;

inputting the driver portrait information, which is used as a fifth input vector, into the deep fusion network, and performing, using a driver portrait analysis channel in the deep fusion network, the multi-head self-attention analysis processing, the residual connection processing, the standardization processing, a collision detection processing and a logistic regression processing on the driver portrait information to generate a fifth analysis vector; and performing a dot product processing on the fourth analysis vector and the fifth analysis vector to obtain the late fusion analysis vector.

12. The electronic device according to claim 8, wherein the temporal event information comprises at least one of information items selected from a group consisting of event category information, event-start-time-information, event-termination-time-information, event-start-speed-information, event-termination-speed-information, relative-collision-minimum-time-information, minimum-collision-distance-information, collision-accumulation-time-information, collision duration information, traffic flow information, vehicle position information, and vehicle driving duration information.

13. The electronic device according to claim 12, wherein after the step of performing the behavior analysis on the driver according to the current driving scene data, the driving behavior data and the mental state data of the driver to obtain the behavior event of the driver, and generating the temporal event information according to the behavior event of the driver, the processor is further configured to perform a step of:

obtaining real-time weather state information in a current driving scene, and adding the real-time weather state information which is taken as one of the information items, to the temporal event information.

14. The electronic device according to claim 12, wherein after the step of performing the behavior analysis on the driver according to the current driving scene data, the driving behavior data and the mental state data of the driver to obtain the behavior event of the driver, and generating the temporal event information according to the behavior event of the driver, the processor is further configured to perform a step of:

obtaining road information in a current driving scene, and adding the road information, which is taken as one of the information items, to the temporal event information.

15. A non-transitory computer readable storage medium which stores a computer program, that, when executed by a processor of an electronic device, causes the processor of the electronic device to implement a method for evaluating a state of a driver, comprising steps of:

performing, according to current driving scene data, driving behavior data and mental state data of the driver, a behavior analysis on the driver to obtain a behavior event of the driver, and generating temporal event information according to the behavior event;

performing, according to normal driving behavior data of the driver in a current time period, a driving habit analysis on the driver to generate driving habit information of the driver in the current time period;

invoking, according to identity information of the driver, a driver portrait library to obtain driver portrait information of the driver; and performing, using a preset information fusion analysis model, an information fusion analysis on the temporal event information, the driving habit information and the driver portrait information, and evaluating the state of the driver according to an analysis result to obtain a state evaluation result of the driver.

16. The non-transitory computer readable storage medium according to claim 15, wherein the computer program is further configured to cause the processor of the electronic device to implement the step of performing, using the preset information fusion analysis model, the information fusion analysis on the temporal event information, the driving habit information and the driver portrait information, and evaluating the state of the driver according to the analysis result to obtain the state evaluation result of the driver by:

performing, using a shallow fusion network in the information fusion analysis model, an early fusion analysis on the temporal event information, the driving habit information and the driver portrait information to generate an early fusion analysis vector;

performing, using a deep fusion network in the information fusion analysis model, a late fusion analysis on the early fusion analysis vector and the driver portrait information to generate a late fusion analysis vector; and evaluating the state of the driver according to the late fusion analysis vector to obtain the state evaluation result of the driver, wherein the state evaluation result of the driver comprises one or more information selected from a group consisting of fatigue level information, distraction information, and driving risk level information.

17. The non-transitory computer readable storage medium according to claim 16, wherein the computer program is further configured to cause the processor of the electronic device to implement the step of performing, using the shallow fusion network in the information fusion analysis model, the early fusion analysis on the temporal event information, the driving habit information and the driver portrait information to generate the early fusion analysis vector by:

inputting the temporal event information, which is used as a first input vector, into the shallow fusion network, and performing, using a behavior event analysis channel of the shallow fusion network, a multi-head self-attention analysis processing, a residual connection processing and a standardization processing on the temporal event information to generate a first analysis vector;

inputting the driving habit information, which is used as a second input vector, into the shallow fusion network, and performing, using a driving habit analysis channel of the shallow fusion network, the multi-head self-attention analysis processing, the residual connection processing and the standardization processing on the driving habit information to generate a second analysis vector;

inputting the driver portrait information, which is used as a third input vector, into the shallow fusion network, and performing, using a driver portrait analysis channel of the shallow fusion network, the multi-head self-attention analysis processing, the residual connection processing, the standardization processing, a collision detection processing and a logistic regression processing on the driver portrait information to generate a third analysis vector;

concatenating the first analysis vector and the second analysis vector to obtain a link vector; and performing a dot product processing on the link vector and the third analysis vector to obtain the early fusion analysis vector.

18. The non-transitory computer readable storage medium according to claim 16, wherein the computer program is further configured to cause the processor of the electronic device to implement the step of performing, using the deep fusion network in the information fusion analysis model, the late fusion analysis on the early fusion analysis vector and the driver portrait information to generate the late fusion analysis vector by:

inputting the early fusion analysis vector, which is used as a fourth input vector, into the deep fusion network, and performing, using a fusion result analysis channel in the deep fusion network, a multi-head self-attention analysis processing, a residual connection processing, a standardization processing and a concatenation processing on the early fusion analysis vector to generate a fourth analysis vector;

inputting the driver portrait information, which is used as a fifth input vector, into the deep fusion network, and performing, using a driver portrait analysis channel in the deep fusion network, the multi-head self-attention analysis processing, the residual connection processing, the standardization processing, a collision detection processing and a logistic regression processing on the driver portrait information to generate a fifth analysis vector; and performing a dot product processing on the fourth analysis vector and the fifth analysis vector to obtain the late fusion analysis vector.

19. The non-transitory computer readable storage medium according to claim 15, wherein after the step of performing the behavior analysis on the driver according to the current driving scene data, the driving behavior data and the mental state data of the driver to obtain the behavior event of the driver, and generating the temporal event information according to the behavior event of the driver, the computer program is further configured to cause the processor of the electronic device to perform a step of:

obtaining real-time weather state information in a current driving scene, and adding the real-time weather state information which is taken as one of the information items, to the temporal event information.

20. The non-transitory computer readable storage medium according to claim 15, wherein after the step of performing the behavior analysis on the driver according to the current driving scene data, the driving behavior data and the mental state data of the driver to obtain the behavior event of the driver, and generating the temporal event information according to the behavior event of the driver, the computer program is further configured to cause the processor of the electronic device to perform a step of:

obtaining road information in a current driving scene, and adding the road information, which is taken as one of the information items, to the temporal event information.

\* \* \* \* \*